Figure 1:
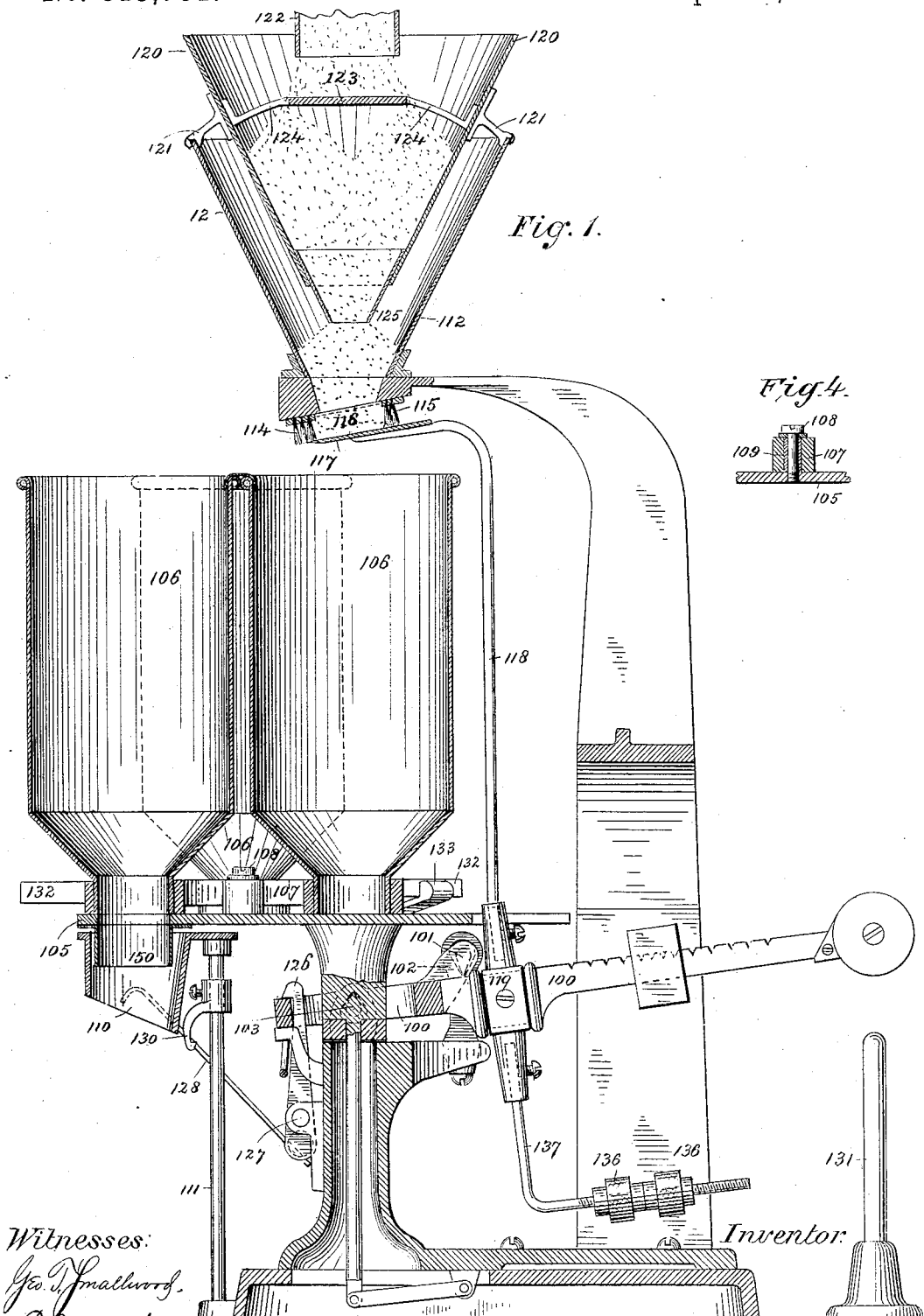

(No Model.) 2 Sheets—Sheet 2.

C. C. CLAWSON.
AUTOMATIC WEIGHING AND PACKAGE FILLING MACHINE.

No. 315,731. Patented Apr. 14, 1885.

Witnesses.
Geo. T. Smallwood.
Philip Mauro

Inventor:
Clement C. Clawson
by Chas. J. Hedrick
his attorney

UNITED STATES PATENT OFFICE.

CLEMENT C. CLAWSON, OF NEWARK, NEW JERSEY, ASSIGNOR OF ONE-HALF TO THURBER, WHYLAND & CO., OF NEW YORK, N. Y.

AUTOMATIC WEIGHING AND PACKAGE-FILLING MACHINE.

SPECIFICATION forming part of Letters Patent No. 315,731, dated April 14, 1885.

Application filed November 12, 1884. (No model.)

*To all whom it may concern:*

Be it known that I, CLEMENT C. CLAWSON, a citizen of the United States, and a resident of Newark, Essex county, State of New Jersey, formerly of Raleigh, North Carolina, have invented certain new and useful Improvements in Automatic Weighing and Package-Filling Machines, of which the following specification is a full, clear, and exact description.

This invention has reference more particularly to machinery for weighing out a given quantity of material and filling the same into a receptacle or package.

In Letters Patent No. 266,951, dated October 31, 1882, is described an automatic machine, of my invention, in which granular or pulverulent material is fed from a hopper into a package supported on the scale-pan of a weighing-scale, and when the package has received its charge the flow is automatically cut off by the closing of a supply-gate connected with the weighing-scale. In the machine shown the weighted scale-beam is upheld by a spindle resting on a cam during the time required for exchanging an empty package for a full one, and then the scale-beam is allowed to descend gradually by the action of the cam. When, however, the scale is used without the cam and spindle, as in a small machine, the beam descends suddenly, and with the ordinary scales it is apt to rebound and continue in vibration for some time. The rebounding and vibration interfere with the delivery of the material, and unless the scale come to rest before the charge is weighed out it interferes also with the accuracy of the weighing, causing the gate to close sooner or later than it ought. To prevent this rebounding of the scale on opening the gate is the object of the first part of the present invention. It consists in placing a stop under the weighted end of the scale-beam, so as to be struck by the same. The stop seems to absorb the energy of the moving beam and prevent rebounding. Whatever the explanation, it enables the beam to come to rest much sooner than it otherwise would. In order to weigh rapidly, it is desirable to deliver a large stream at first, and when the bulk of the charge has been delivered to reduce the stream, so that the gate in closing shuts off a comparatively small stream.

Heretofore it has been proposed to have the scale effect such a reduction in the flow of material by closing a valve; and in another application of even date herewith I have shown how it may be done by a cam acting upon a valve. The desired result is effected in this invention without the use of movable valves by combining with a spout or hopper having a contracted orifice a funnel or small reservoir, which is provided with a larger delivery-opening to be closed by the supply-gate of the automatic weighing-scale, and into which the spout or mouth of the hopper projects, leaving a suitable space below the contracted orifice. When the supply-gate is closed, the material descends through the orifice and fills the funnel or reservoir to its own level. Then the material in the funnel or reservoir seals, as it were, the orifice and prevents more material from passing out. When the supply-gate is opened, the material escapes rapidly and runs completely out of the funnel or reservoir before the scale receives its charge. Then the delivery continues from the contracted orifice above until the supply-gate closes.

It is desirable to be able to vary the quantity of material in the funnel or reservoir, in order to suit charges of different weights. This can evidently be done by adjusting the spout or hopper vertically, so as to leave more or less distance between its orifice and the delivery-opening in the funnel or reservoir. It can also be done by making the hopper removable, so that it can be replaced by one which descends lower or not so low in the funnel or reservoir, and which may also have a smaller or a larger orifice. It is best effected by the use of removable bushings of frusto-conical form, which fit in the hopper, and which may be of various lengths with various-sized orifices. The smaller the quantity weighed the smaller should be the orifice, in order to secure an accurate weighing. When granular material is fed through a long tube or spout, it is found that the pressure will affect the flow through the orifice and produce inequalities in the weighings. To prevent this, a plate or disk is supported at the mouth of the tube or spout. It takes off the pressure due to the column of material. The material passes over the edges of the disk or plate. In many cases it is not desirable or practicable to support the package or receptacle to contain the weighed material on the scale-pan—as, for example, if the material is to be weighed independently of the package, or when the material is to be packed in bags. To meet such cases the following dispositions are adopted: The scale-pan is provided with a receptacle, which makes part of the machine, and is adapted to discharge as well as receive the material weighed. In connection with such a scale-pan a retaining-latch is provided for holding the scale-pan depressed. To increase the rapidity of weighing, instead of providing the scale-pan with a single receptacle, two or more of these are employed, and they are so constructed and arranged that one receptacle can be filling while another is discharging.

I am well aware that a scale-pan for an automatic scale adapted to discharge the material weighed is not new; also, that grain-meters have been made with two grain-receptacles which receive the grain from a common spout, and are adapted the one to discharge while the other is filling. The latch arrangement to such a scale, and also the particular construction and combination of parts in and about the scale-pan, are believed to be new.

To prevent the scale-pan and scale-beam from moving on their knife-edges, the openings in which these enter are made V-shaped, with a larger angle at the apex than at the apex of the knife-edges.

Having explained the principle of the invention, what is considered the best mode of carrying the same into effect will now be described with the aid of the accompanying drawings, which form a part of this specification.

Figure 2:
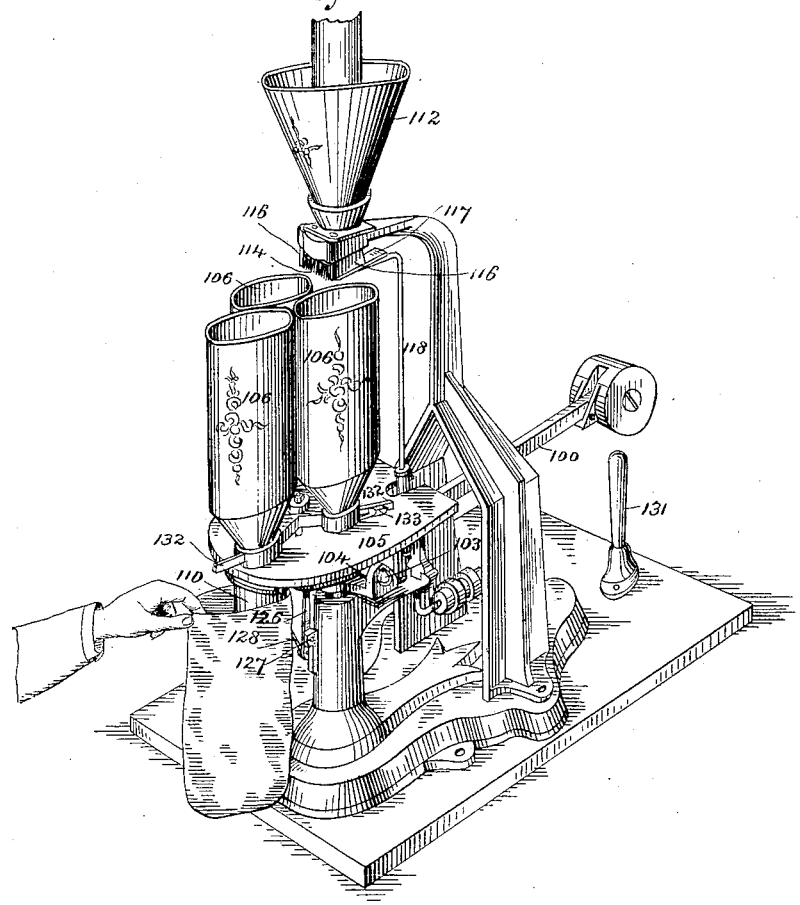
Figure 3:
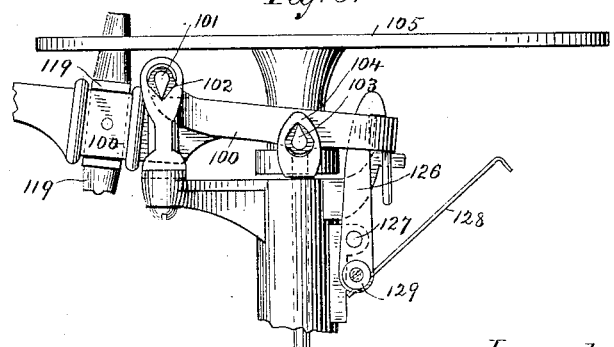

Figure 1 is a vertical section parallel to the scale-beam of one of the new or improved machines; Fig. 2, a perspective view of the same, and Figs. 3 and 4 detail views.

The scale-beam 100 is supported on knife-edges 101, which enter V-shaped openings 102 in the machine-frame. The scale-pan is supported at the front (left-hand, Fig. 1) end of the beam on knife-edges 103, fixed in the beam, which enter V-shaped openings in the arms 104, attached to or making part of the scale-pan. The upright position of the scale-pan is maintained in the usual way by a link in the base of the frame. At the top of the scale-pan is a flat plate, 105. On this plate are supported the receptacles 106, (three, as shown,) for receiving the material to be weighed. They are open at both ends. Their lower ends rest upon the plate 105, which is ground or turned off smooth, and forms the bottom to the receptacles. The receptacles are attached to a spider-frame, 107, at equal distances from the center. Said spider-frame has a central hub, and is pivoted to the plate by a screw, 108, passing through said hub and tapped into the plate. There is a sleeve, 109, surrounding the shank of the screw upon which the hub turns. At each receptacle 106 is a pin, 132, rigidly attached to the spider-frame. On the plate 105 is a spring-stop, 133, consisting of a flat plate fastened at one end to the plate and having a projector at the outer end. The stop is in the path of the pins 132, but can be depressed to remove it out of the way when it is desired to turn a receptacle. In front of the scale, under the plate 105, which is there perforated, is a small spout, 110, supported by the upright rods 111, fixed at their lower ends in the machine-frame. There is also a small spout, 150, attached to the under side of the plate 105. Above the scale-pan is the funnel or reservoir 112, supported by the bracket making part of the machine-frame, and having a delivery-opening in the bottom. The hole in plate 105 and the delivery-opening in the funnel or reservoir 112 are so placed that when one receptacle 106 is over the hole the next one is under the delivery-opening. The mouth-piece is fastened to the funnel or reservoir 112, or rather to the bracket supporting the funnel or reservoir. It has a brush, 114 and 115, at front and back, respectively, and metallic side walls, 116. The bristles of front brush, 114, project slightly below the edges of the side walls. The supply-gate 117 works below the mouth, being fastened to the upper end of the arm 118, whose lower end fits in the socket-piece 119, fastened to the scale-beam, and is there held by a set-screw. The supply-gate is so adjusted that as it passes under the front brush, 114, it makes contact with the same. The lower edge of the side walls, 116, and the front of the supply-gate are beveled. Above the funnel or reservoir 112 is the hopper 120, removably supported by the arms 121, fixed to the hopper and resting upon the edge of the funnel or reservoir. A spout, 122, conducts the material to be weighed into the hopper from an elevated bin. Below the mouth of the spout is the disk or plate 123, which is upheld by the arms 124, resting against the inside of the hopper. At the bottom of the hopper is a removable bushing, 125.

To fill small packages, a long bushing with a small orifice is used; for larger packages a shorter one with larger orifice. The latch 126 is placed below the scale-pan. It is pivoted at 127 to the scale-frame, and its upper end is adapted to engage the front end of the scale-beam when the scale-pan descends and the latch is not held back. A wire, 128, is attached to and projects forward from the latch. Its inner end is clamped beneath the washer 129, which is held by a screw tapped into the latch. It is therefore adjustable. When the package is placed around the spout 110, the edge thereof strikes the wire and lifts it, releasing the beam and allowing the scale-pan to rise.

On the rods 111, on either side of the spout 110, are the hooks 130, for supporting a bag with its mouth extended. They are so arranged that when the mouth of the bag is placed over them the edge of the bag holds the latch-wire 128 in its raised position. Under the weighted or rear end of the beam is placed a stop, 131, so arranged that the beam makes contact with the upper end thereof when the scale-pan has risen to its full height. As shown, the beam is provided in addition to the adjustable weight with a weight rigidly fastened at the end of the beam. This need not be used, or it may be replaced by a hanging disk to receive removable weights, as common in weighing-scales. Below the rear end of the scale-beam are the nut-weights 136, adjustable on the bent screw-rod 137, whose upper end is held in the socket-piece 119.

The operation of the machine is as follows: Assuming the scale-pan to be latched down and the supply-gate closed, the granular material descends through the spout 122 and fills the hopper 120 to or nearly to the lower end of the spout, and the reservoir or funnel 112 to or nearly to the lower end of the bushing 125, or, if no bushing is used, to the lower end of the hopper 120. If the receptacle 106, which at the time is under the reservoir or funnel 112, be empty, the attendant trips with his hand the latch 126, whereupon the weighted end of the scale-beam descends, and at the end of its movement strikes the stop 131, the scale-pan rises, and the supply-gate 117 is withdrawn. The tendency of the scale to rebound is diminished by the action of the stop 131, and the beam soon comes to rest. As soon as the supply-gate is opened the material in the funnel or reservoir 112 runs out rapidly through the delivery-opening into the receptacle 106 until the funnel or reservoir is empty. As the amount (in consequence of the regulation made to that end) is insufficient to bear down the scale-pan, the material continues to flow, but in a smaller stream, through the smaller orifice of the bushing 125, or of the hopper 120, if no bushing be used. The level of material in the hopper 120 is maintained constant by the flow from the spout 122, the pressure of the column in said spout being taken off by the disk or plate 123. When the receptacle 106 has received its charge, the scale-pan descends and is automatically latched down. As the supply-gate 116 closes it makes a light contact with the front brush, 114, and the slight friction prevents any tendency of the scale-pan rebounding. The attendant now places the package under the spout 110 and raises it till the upper edge strikes and lifts the wire 128, tripping the latch 126 and releasing the scale. If the package be a bag, the edges are caught over the hooks 130, in which position the edge of the bag holds up the wire 128. Although the latch is released, the scale does not move, because the charge is still in the receptacle 106. The attendant takes hold of the pin 132, and with the thumb depressing the stop 133 turns the spider-frame 107 so as to bring the charged receptacle over the opening in the plate 105 and an empty one under the funnel or reservoir 112. The spider-frame is stopped at the proper place by the next pin, 132, striking the stop 133, which has been released as soon as the former pin was disengaged. The charge in the receptacle which has been turned over the hole in plate 105 runs through the spout 110 into the package placed below it. So soon as the discharge begins the scale-pan rises, the supply-gate is withdrawn, and the delivery into the succeeding receptacle (now under the funnel or reservoir) commences. Thus while one receptacle is discharging another is filling. The filled package would ordinarily be removed and an empty one inserted by the time the receptacle has received its charge.

It is evident that modifications could be made in details without departing from the spirit of the invention, and that parts of the invention could be used separately.

No claim is made herein to any matter shown in either of my applications of even date herewith and officially numbered 147,801 and 147,802, respectively, the design being to claim all such matters so far as they may be new in application No. 147,801, or if not shown therein, then in application No. 147,802.

Having now explained the invention and the manner in which the same is or may be carried into effect, what I claim, and desire to secure by Letters Patent, is—

1. The combination, with the scale and the supply-gate attached to the upper end of a supporting-arm which is fastened at the lower end to the scale-beam and is carried by said beam, of the stop placed under the weighted end of the scale-beam to diminish or prevent the vibration of the scale when the scale-pan rises, substantially as described.

2. The combination, with a hopper, a spout, or a bushing having a contracted orifice, of a reservoir or funnel provided with a larger delivery-opening, and a supply-gate for closing and uncovering said opening, said hopper, spout, or bushing extending into said reservoir or funnel and terminating at a suitable distance from the bottom thereof, substantially as described.

3. The combination, with an automatic weighing-scale and the supply-gate controlled thereby, of the reservoir or funnel provided with a large delivery-opening, and a hopper, spout, or bushing provided with a smaller orifice, supported with said orifice in the funnel or reservoir at a suitable distance above the bottom thereof, substantially as described.

4. The combination, with the reservoir or funnel having the delivery-opening, and the hopper, spout, or bushing provided with a smaller or more contracted orifice, and arranged to project into said reservoir or funnel, of means, substantially as described, for varying the distance of said orifice above the bottom of said reservoir or funnel, as set forth.

5. The combination, with the reservoir or funnel provided with the delivery-opening and the gate for closing and uncovering said opening, of the removable hopper having an orifice smaller than the said delivery-opening and supported above said reservoir or funnel with the orifice inside of the same at a suitable distance from the bottom thereof, substantially as described.

6. The combination of the reservoir or funnel, the hopper, and the removable bushing to the hopper, said bushing being disconnected from said reservoir or funnel, so as to be removable independently of the same, substantially as described.

7. The combination, with the weighing-scale and the supply-gate controlled thereby, of the funnel or reservoir provided with a delivery-opening which is closed and uncovered by said gate, and the hopper, spout, or bushing extending into said funnel or reservoir, substantially as described.

8. The combination, with a hopper and a tube or spout projecting into said hopper, of a disk or plate supported in said hopper below the mouth of the tube or spout, substantially as described.

9. The combination of the funnel or reservoir, the hopper supported above said funnel or reservoir, the spout or tube, and the plate supported in said hopper below the mouth of said tube or spout, substantially as described.

10. The combination, with the weighing-scale and supply-gate controlled thereby, of the reservoir or funnel provided with the delivery-opening, the hopper provided with a smaller orifice, the spout or tube, and the plate or disk supported in said hopper below the mouth of said spout or tube, substantially as described.

11. The combination, with an automatic weighing-scale and a hopper from which the supply of material to be weighed is taken, of a spout or tube delivering the material into the hopper, and a plate or disk supported in said hopper below the mouth of said spout or tube, substantially as described.

12. The combination, with a weighing-scale provided with a receptacle making part of the machine, and adapted to receive the charge weighed, of a self-engaging latch holding down the scale-pan, substantially as described.

13. In combination with a weighing-scale, a latch for holding down the scale-pan, provided with a device—such as a wire—arranged to be lifted by the edge of the package to be filled to release the latch, substantially as described.

14. The combination, with a weighing-scale provided with a dumping-receptacle for the material weighed, of a stationary spout for conveying the material when discharged into the package, and the automatic latch for holding down the scale-pan adapted to be released by placing the package in proper position under or around said spout, substantially as described.

15. The weighing-scale provided with two or more open-bottomed movable receptacles, supported above the scale-beam and maintained in an upright position thereon, in combination with a reservoir, spout, or hopper for delivering the material into said receptacles, and a supply-gate connected with and operated by said scale, substantially as described.

16. In a weighing-scale, the scale-pan comprising a flat plate, and one or more open-bottom receptacles resting on said plate and attached to a frame pivoted to said plate, substantially as described, so that the receptacles can be turned around the pivot.

17. The combination, with the weighing-scale having two or more receptacles carried by a pivoted frame and resting upon a flat plate making part of the scale-pan, of a reservoir, hopper, or spout provided with a delivery-opening, and the supply-gate controlled by said scale, substantially as described.

18. The combination, with the flat plate, the two or more receptacles thereon, and the pivoted frame to which said receptacles are attached, of the movable stop for preventing the said frame being turned too far, substantially as described.

19. The combination, with a weighing-scale having one or more dumping-receptacles, of the hooks on the machine-frame for supporting a bag with the mouth open in position to receive the charge from said receptacles, and the latch for holding down the scale-pan provided with a releasing device—such as a wire—arranged in proximity to said hooks, substantially as described.

20. The combination of the weighing-scale, the hooks on the machine-frame, and the latch provided with an operating-wire arranged relatively to one of said hooks, as described, so that it is held up by the edge of a bag on said hooks.

21. The combination, with the scale-pan and scale-beam of a weighing-scale provided with dumping-receptacles for the material weighed, of the knife-edges for supporting said scale-pan and scale-beam, said knife-edges projecting into V-shaped openings, substantially as described.

22. The combination, with a weighing-scale provided with one or more dumping-receptacles, of a reservoir, hopper, or spout for delivering material into said receptacles and a supply-gate attached to and carried by the upper end of the supporting-arm, which is itself attached to and carried by the scale-beam, substantially as described.

In testimony that I claim the foregoing as my invention I have signed my name to this specification, in the presence of two witnesses, this 29th day of October, 1884.

CLEMENT C. CLAWSON.

Witnesses:
GEO. W. WILKINS,
C. J. HEDRICK.